Nov. 14, 1961

L. C. FRIEND ET AL 3,009,031

SELF-COMPENSATING PRESSURE-SENSITIVE CAPSULE
PARTICULARLY ADAPTED FOR SEALED
PRESSURE SWITCHES

Filed Dec. 8, 1958

DIAPHRAGMS 10 & 11
BOTH DEFLECT IN
SAME DIRECTION UPON
CHANGE IN TEMP.

INVENTORS
LINDSAY C. FRIEND.
KENNETH D. SHAUB.

BY K. G. Doub

ATTORNEY

United States Patent Office 3,009,031
Patented Nov. 14, 1961

3,009,031
SELF-COMPENSATING PRESSURE-SENSITIVE CAPSULE PARTICULARLY ADAPTED FOR SEALED PRESSURE SWITCHES
Lindsay C. Friend, Baltimore, and Kenneth D. Shaub, Timonium, Md., assignors to The Bendix Corporation, a corporation of Delaware
Filed Dec. 8, 1958, Ser. No. 778,852
4 Claims. (Cl. 200—83)

This invention relates to pressure-responsive devices such as pressure switches for use in electrical circuits and other installations where some operation is to be performed as a function of pressure; it is particularly concerned with sealed pressure switches of that type employing a pair of diaphragms connected at their peripheral edges to spaced supporting plates which are adjustable towards and away from one another to vary the spacing of internal contacts carried by the diaphragms.

It is well known that the modulus of elasticity of a metallic diaphragm is affected by changes in temperature, and if a pressure cell or capsule utilizing such a diaphragm is subjected to a temperature different from that at which it was calibrated, deflection of the diaphragm at a given pressure will vary from the calibration curve, unless some means is provided to compensate for the effects of temperature. In prior known pressure switches of the type specified, it was customary to match as closely as possible the thermal characteristics of the diaphragm-supporting plates with those of the diaphragms, and then to compensate for the effects of temperature changes on the diaphragms per se by back-filling or loading the cell with a predetermined amount of air or other fluids, such as an inert gas having a substantially linear response to changes in temperature. Theoretically, if matching was perfect, such a method would prove satisfactory. However, it becomes quite a problem to obtain material for the supporting components which can be matched to the diaphragms in this manner, and especially is this true where the diaphragms are required to be made of some particular metal or alloy having certain desirable characteristics, as for instance a metal capable of being welded and at the same time retaining a specified modulus of elasticity over a wide range of temperature. A metallic alloy sold under the trade name of Ni-Span C currently comes closest to meeting these requirements. The matching difficulty becomes more pronounced in view of the fact that the mounting plates are, from a practical standpoint, of greater cross-sectional thickness than that of the diaphragms. It will be obvious that unless the thermal coefficient of expansion and contraction of the diaphragms and plates are so matched, there will be an unequal rate of expansion and contraction between the diaphragms and plates upon a change in ambient temperature, and in prior known types of pressure switches and similar devices, this unequal rate of expansion caused the diaphragms to flex in opposite directions. Thus with a pair of supporting plates having circular openings each spanned by a diaphragm, a decrease in temperature at a given pressure would cause the diaphragms to flex inwardly towards one another and decrease the volume of the pressure cell, and conversely upon an increase in temperature at a given pressure, the diaphragms would flex outwardly away from one another and increase the volume of the cell; and this action was more pronounced as the changes increased in magnitude, the temperature errors being additive. Furthermore this flexing action was a non-linear function of temperature and hence difficult to correct by utilization of temperature-responsive means such as thermal strips and the like in the component parts of the switch. Various methods for correcting the error due to temperature response at a given pressure have been advanced in the past, such as using diaphragms one of which has a positive temperature coefficient of expansion and the other a negative coefficient of expansion, with the thought that the error in the response of one will cancel out the error of the other. While this method may prove feasible with capsules in which the diaphragms are connected in edge-to-edge relation and only the diaphagms themselves are involved, it presents a greater matching problem in devices utilizing supporting components or plates than is the case with conventional diaphragms.

The primary object of the present invention therefore is to provide a pressure cell of the type specified in which compensation for changes in temperature is more nearly perfect than in known pressure cells of the prior art. Broadly stated, the device which constitutes the subject matter of the present invention comprises a plurality of diaphragms, usually one or more pairs, preferably matched as closely as may prove feasible with respect to thermal response characteristics, secured at their marginal edges as by welding to a pair of spaced supporting plates, also matched in a like manner, the plates in turn being connected by a flexible side wall such as a bellows, which together with the diaphragms constitute the walls of a pressure chamber usually charged with a gas or fluid having a substantially linear temperature response, the diaphragms being shaped and arranged in a manner such that both move in the same relative direction and at the same rate when the plates expand and/or contract in response to changes in temperature at a given pressure. Thus, the temperature error of one diaphragm will cancel the temperature error of the other and the spacing of the diaphragms will remain substantially constant for a given pressure at all temperatures.

Another and more specific object is to provide a diaphragm-type pressure cell having an improved temperature-compensating action and particularly adapted for use as a sealed pressure switch, in which the diaphragms may be made from a material having specified modulus of elasticity connected to supporting plates, the material of which plates may be selected without particular regard to matching the thermal characteristics thereof with those of the diaphragms, thereby facilitating manufacture and reducing the overall cost of the switch while at the same time improving the performance thereof.

The foregoing and other objects and advantages will become apparent in view of the following description taken in conjunction with the drawings wherein.

Figure 1:
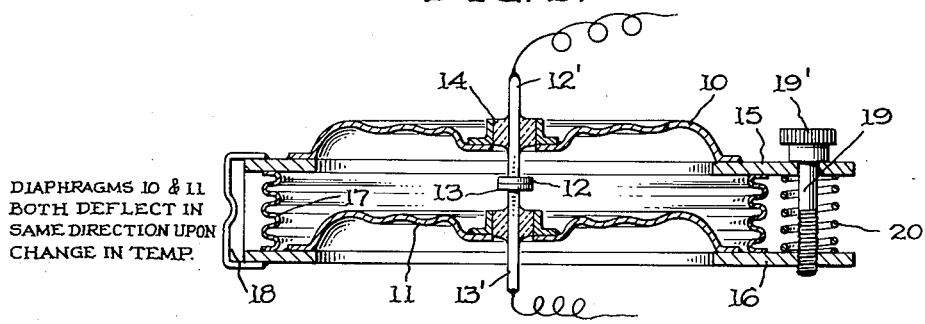
FIG. 1 is a substantially central transverse cross-section of a pressure switch in accordance with the invention.
Figure 2:
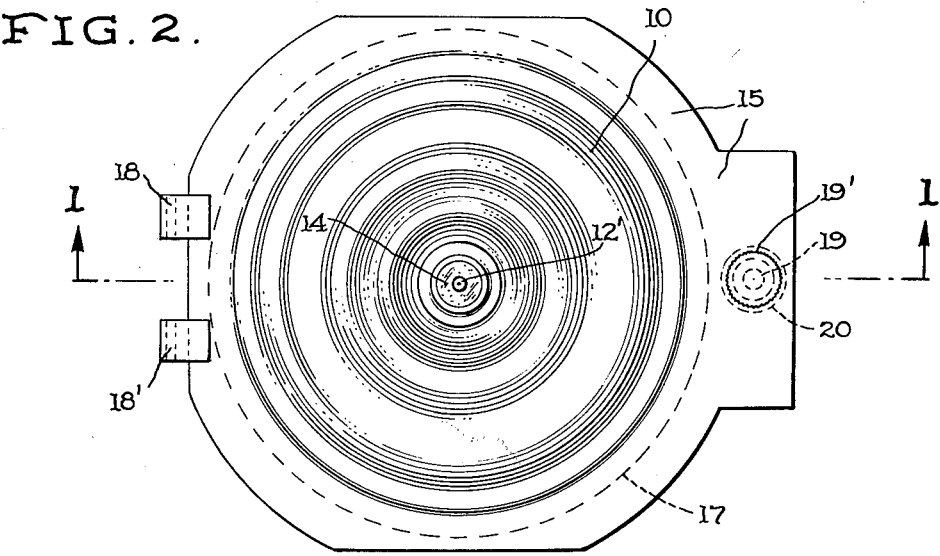
FIG. 2 is a top plan view thereof.

The drawing illustrates a typical self-compensating pressure switch embodying the feaures of the invention. In FIGS. 1 and 2 a pair of diaphragms are indicated at 10 and 11; they are made of material matched as to its thermal characteristics (coefficient of expansion) as closely as commercial production renders feasible. Durability and performance specifications may require a material having a high modulus of elasticity and ability to retain same over a wide temperature range. Beryllium copper is satisfactory but is not susceptible to welding. A weldable material which currently comes closest to meeting these requirements is a metallic alloy sold under the trade name Ni-Span C. The diaphragms are usually formed with a series of corrugations which are conventional; they influence the deflection-versus-pressure characteristics of the diaphragm. The particular shape of each diaphragm is not critical, except that it must have a dished contour such that when the diaphragm is circumferentially or peripherally constricted and/or distended, it will always flex in a given direction. When the diaphragms are similar in size, shape and cross-section as illustrated in FIGS. 1 and 2 of the drawing, they will both flex uniformly in one direction should the plates 15 and 16 expand and/or contract. A pair of internal contacts 12 and 13 are fixed on the ends of conductors 12' and 13', which project through seals 14 of suitable insulating material such as glass, the seals being fused at their radial edges to the contiguous edges of the diaphragms.

At their peripheral or marginal edges, the diaphragms are secured as by welding to a pair of rigid metallic mounting or supporting plates 15 and 16, each of which is formed with a circular opening spanned by a diaphragm. The inner opposed surfaces of the plates are connected by a flexible wall member in the form of a metallic bellows section 17, which resiliently holds the plates in definite spaced relation at a given internal pressure; it functions as a partial cell enclosure. At one side of the switch, the plates 15 and 16 are connected by hinge straps 18, 18' and at the opposite side an adjusting screw 19 is journaled in the upper plate and threaded into the lower plate and has an enlarged knurled head 19'. A spring 20 biases the plates apart against the holding action of the screw. By adjusting the screw 19, the spacing of the contacts 12 and 13 may be set with a high degree of accuracy and stability. The plates 15 and 16 are adapted to be secured to heavier and more rugged supporting members in certain types of installations, as where a gang of switches are located in a single casing and each switch controls a circuit for energization or deenergization thereof at a given pressure or altitude. Switch adjustment or contact-spacing and setting may be manual or automatic and preset or remotely set. Remotely-set switches are usually controlled by servo mechanism having a drive connection with the screw 19.

It will be obvious that to match the thermal characteristics of the diaphragms with like characteristics of the plates and other supporting components becomes a difficult proposition. However, such matching is not necessary in the switch arrangement as disclosed herein. Thus should the temperature decrease from a given reference value, say room temperature, the rings 15, 16 will contract and flex both diaphragms 10 and 11 upwardly in unison, as viewed in FIG. 1. Ordinarily, this flexing movement would take place gradually as contraction proceeds. Let the temperature error of diaphragm 10 be considered at $T_{10}$ and that of the diaphragm 11 as $-T_{11}$, then the total error will be $T_{10}+(-T_{11})$. Thus the temperature errors are self-cancelling and the spacing of the diaphragms remains substantially constant for a given pressure at all temperatures.

Ni-Span C material is conveniently fabricated in strips of specified width and the diaphragms are stamped or cut therefrom and shaped under closely-controlled conditions. As a consequence, the material of each diaphragm usually has substantially the same thermal characteristics. The plates may be made from a good grade of ordinary steel, preferably having like thermal characteristics or matched as closely as possible. The chamber defined by the capsules and bellows is usually charged with a predetermined volume of air to provide temperature compensation, and this compensating action will be substantially linear throughout the temperature range. Since relative expansion between the diaphragms and their supporting components is no longer a critical factor, the materials can be selected more freely, permitting simultaneous improvement in performance and reduction in cost of manufacture.

Figure 3:
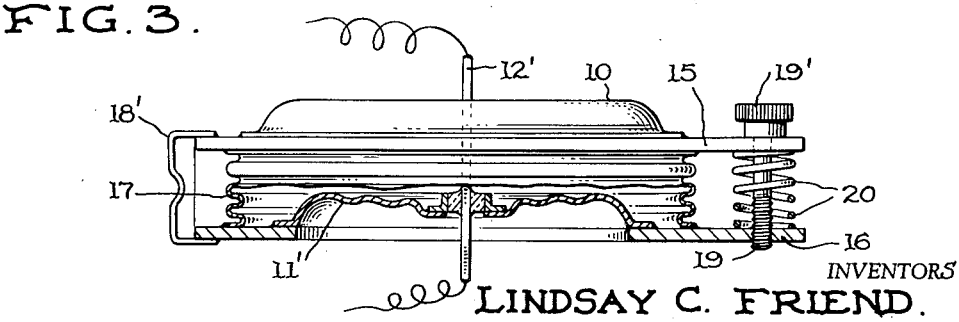
FIG. 3 is a view similar to FIG. 1 of a slight modification in structure.

FIG. 3 illustrates an arrangement wherein, for a given temperature change, one diaphragm, due to a difference in size, will deflect at a rate different from that of the other and to a less extent and compensate for expansion characteristics in the plate-connecting linkage. In this view, the only part different from its counterpart in FIGS. 1 and 2 is the lower diaphragm, indicated at 11', which is smaller than the upper diaphragm 10. This design may prove desirable where the linkage which connects the plates 15 and 16 to one another (here the hinge straps 18, 18', screw 19' and spring 20) might introduce an error which, were it not compensated for by a difference in diaphragm dimensions, would prevent cancellation of the total error.

What we claim is:

1. A pressure-sensitive capsule comprising a pair of spaced substantially rigid supporting plates each having a generally circular opening therein, a resilient metallic corrugated wall member connecting said plates, a pair of metallic diaphragms of substantially overall dish-shaped contour spanning said openings and having their marginal edges secured to said plates, said diaphragms and wall member constituting the flexible walls of a sealed pressure chamber, the diaphragms being substantially matched with respect to their thermal coefficient of expansion and having the dish-shaped areas thereof projected in the same axial direction whereby should the plates expand and/or contract due to changes in temperature the said diaphragms will flex in unison in the same axial direction to different positions without changing their relative spacing, said chamber being charged with a fluid having a substantially linear response to changes in temperature.

2. A pressure-sensitive capsule as claimed in claim 1 wherein the plates are adjustably connected to one another by flexible linkage and one of said metallic diaphragms is of different dimensions than the other to provide compensation for any errors that may be introduced by the response of said linkage to changes in temperature.

3. A pressure-sensitive capsule comprising a pair of substantially rigid supporting plates each having a generally circular opening therein, a resilient metallic corrugated wall member connecting said plates, a pair of metallic diaphragms of substantially overall dish-shaped contour spanning said openings and having their marginal edges secured to said plates, said diaphragms and wall member constituting the flexible walls of a sealed pressure chamber, the diaphragms being substantially matched with respect to their thermal coefficient of expansion and having the dish-shaped areas thereof projected in the same axial direction whereby should the plates expand and/or contract due to changes in temperature the said diaphragms will flex in unison in the same axial direction to different positions without changing their relative axial spacing, said chamber being charged with a fluid having a substantially linear response to changes in temperature, and means for adjusting said plates axially towards and away from one another to reset the spacing of said diaphragms.

4. A sealed pressure switch comprising a pair of substantially rigid supporting plates each having a generally circular opening therein, a pair of metallic diaphragms of substantially overall dish-shaped contour spanning said openings and having their marginal edges secured to said plates, said diaphragms and wall member constituting the flexible walls of a sealed pressure chamber, a pair of coacting contacts carried by said metallic diaphragms located in said chamber and provided with conductors projected through the axial areas of said diaphragms to the exterior of said chamber, the diaphragms being substantially matched with respect to their thermal coefficient of expansion and having the dish-shaped areas thereof projecting in the same axial direction whereby should the plates expand and/or contract due to changes in temperature the said diaphragms will flex in unison in the same axial direction to different positions without changing their relative axial spacing and the spacing between said contacts, said chamber being charged with a fluid having a substantially linear response to changes in temperature, and means for adjusting said plates towards and away from one another to reset the spacing of said contacts.

References Cited in the file of this patent

UNITED STATES PATENTS

| | | |
|---|---|---|
| 1,102,566 | Besley | July 7, 1914 |
| 2,656,428 | Harris | Oct. 20, 1953 |
| 2,671,833 | Dunmyer et al. | Mar. 9, 1954 |
| 2,798,130 | Cox | July 2, 1957 |
| 2,839,630 | Wood | June 17, 1958 |